Nov. 27, 1928.

L. N. SOUTHMAYD 1,693,409

METHOD OF MAKING CUSHION SOLID TIRES

Filed April 18, 1923

INVENTOR.
Leon N. Southmayd
BY
Edward Taylor
ATTORNEY.

Patented Nov. 27, 1928.

1,693,409

UNITED STATES PATENT OFFICE.

LEON N. SOUTHMAYD, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MAKING CUSHION SOLID TIRES.

Application filed April 18, 1923. Serial No. 632,810.

This invention relates to methods of making solid tires of the type having a circumferential internal recess. It has for one object the provision of an improved form of core for forming one or more recesses, by means of which a non-split rim may be used. It has for another object an improvement of the method of manufacture of the tire, whereby the internal recess will be located in the finished tire with great accuracy. It has for a further object an improved cushion tire and rim combined in an integral unit. It has various other and further objects which will appear from the following description and claim.

The invention will now be described in connection with the accompanying drawings, in which Fig. 1 is a section showing one stage in the building of a tire having a single circumferential recess;

Figure 1:
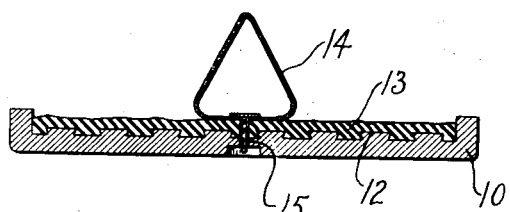

One proposed form of cushion solid rubber tire has a circumferential internal cavity or recess to permit flexing of the rubber, thus increasing the easy riding qualities of the tire and prolonging its life. The use of a rigid core for this purpose has necessitated the splitting of the rim so that the core can be removed after vulcanization. This weakens the rim, or requires extra expense in later welding or otherwise joining the rim sections. By the method of my invention the necessity for splitting the rim is done away with, while at the same time the advantages of incompressibility inherent in the rigid core are retained.

Throughout the figures the tire has been shown in radial section without any attempt being made to show it in full circumference, this manner of representation being common in similar cases. The tire is shown as mounted on an annular metal rim 10, having side flanges 11 and dovetails or other roughening 12 to increase the adhesion between the rim and the tire. It is customary in the building of solid tires to have a layer of hard rubber next to the rim in order to make more perfect the bonding at this point. The hard rubber is shown at 13. Either directly upon this hard rubber or upon a slight thickness of superposed soft rubber similar to the body of the tire, is placed an annular bag 14 of rubber or rubberized fabric, and shaped to correspond to the recess desired in the completed tire. The bag is provided with a valve 15, whereby it may be filled with water and sealed up. The valve conveniently passes through the rim so that the water can be drained out after vulcanization.

Figure 3:
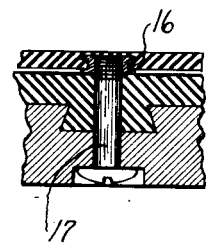
Fig. 3 is a detail section of a securing device for the annular core.
Figure 2:
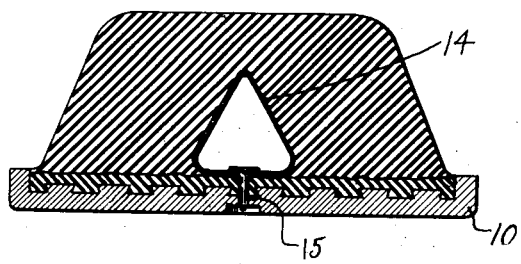
Fig. 2 is a section of the completed tire.

In case difficulty is experienced in preserving the bag at the exact center of the tire throughout the circumference, it can be held in place by lugs illustrated in Fig. 3, their use being preferred as a means of insuring proper registration of the bag. A convenient form of lug is shown in Fig. 3. It comprises a grommet or ferrule 16 embedded in the body of the bag, and a screw 17 passing through the rim and threaded into the grommet.

After the bag is located the tire is built up around it, either by laminating strips of rubber or extending a mass of rubber of the proper form. The built up tire is inserted in the usual vulcanizing mold (which in this case need be no different from that used in vulcanizing a solid tire without an internal recess), and subjected to heat and pressure to vulcanize the rubber. The tube or bag 14 is filled with water either under a constant pressure maintained through the valve or with the valve closed so that the water causes the bag to act as an incompressible core. After vulcanization the valve may be opened, and the water allowed to escape.

Figure 4:
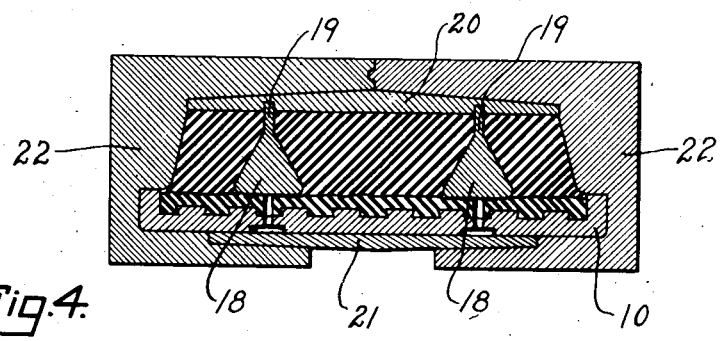
Fig. 4 is a section showing a modified method of preparing the tire, the tire being also shown in this case with two recesses instead of one.
Figure 5:
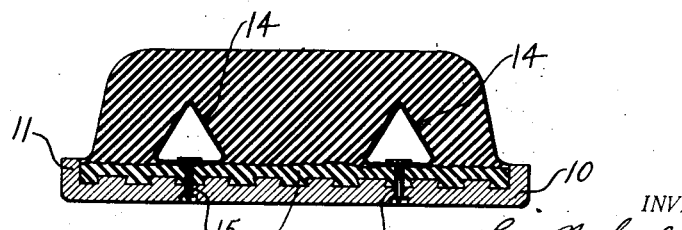
Fig. 5 is a section of the tire of Fig. 4 after completion.

A modification of the building process is illustrated in Fig. 4, which is of use in cases where it is difficult to keep the bags in position due to the flow of rubber during molding or some other cause. In this case the tire is partially built up (Fig. 4) around an annular metal core 18 (shown as two in number in Fig. 4 to produce a tire with two recesses like Fig. 5). These metal cores have necks 19 by which they can be held centered during the building operation. The tire so built around the cores is given a partial vulcanization in a suitable mold, one form of which is shown in Fig. 4. In the illustrated case it comprises a tread ring 20, a base ring 21, and side members 22. The tread ring has grooves for the necks 19 of the cores, so that they are positively held against movement during molding. After this partial vulcanization the rubber of the tire will have set sufficiently to prevent displacement of the bag when later inserted. The partially cured tire is now removed from the mold, the sectional cores 18 stripped out of the tire from the top, and the bags 14 put in their places. The remainder of the tire can now be built up over the bags, suitable allowance being made in the composition of the stocks for the necessary difference in cures, and vulcanization completed as in the case of the tire built up around the bag as first described.

Having thus described my invention, I claim:

A method of making cushion solid tires, which comprises partially building the tire around a rigid core having an external projection preventing closing of the tire material around the core, partially vulcanizing the tire, removing the core, inserting a liquid-containing bag, completing the building of the tire, and completing the vulcanization of the tire while said bag is filled with liquid under pressure.

LEON N. SOUTHMAYD.